United States Patent
Duennwald et al.

(10) Patent No.: US 11,260,405 B2
(45) Date of Patent: Mar. 1, 2022

(54) VENTILATION MODULE FOR A RAIL VEHICLE

(71) Applicant: Siemens Mobility GmbH, Munich (DE)

(72) Inventors: Tim Duennwald, Munich (DE); Frank Ebert, Munich (DE); Thomas Plinninger, Rosenheim (DE); Norbert Reissing, Regensburg (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/043,115

(22) PCT Filed: Feb. 28, 2019

(86) PCT No.: PCT/EP2019/054936
§ 371 (c)(1),
(2) Date: Sep. 29, 2020

(87) PCT Pub. No.: WO2019/185275
PCT Pub. Date: Oct. 3, 2019

(65) Prior Publication Data
US 2021/0016299 A1     Jan. 21, 2021

(30) Foreign Application Priority Data
Mar. 29, 2018 (DE) .............................. 102018204871

(51) Int. Cl.
*B01D 50/00* (2006.01)
*B04C 9/00* (2006.01)
(Continued)

(52) U.S. Cl.
CPC ................ *B04C 9/00* (2013.01); *B01D 45/16* (2013.01); *B01D 50/002* (2013.01); *B04C 5/14* (2013.01);
(Continued)

(58) Field of Classification Search
CPC .... B04C 9/00; B04C 5/14; B04C 5/28; B04C 2009/002; B04C 2009/005; B01D 45/16;
(Continued)

(56) References Cited

U.S. PATENT DOCUMENTS 4,348,057 A * 9/1982 Parenti ..................... E21F 5/20
299/12
4,746,340 A * 5/1988 Durre .................... B01D 45/12
55/347

(Continued)

FOREIGN PATENT DOCUMENTS

| CN | 201102547 Y | 8/2008 |
| CN | 101885338 B | 8/2012 |

(Continued)

*Primary Examiner* — Dung H Bui
(74) *Attorney, Agent, or Firm* — Laurence A. Greenberg; Werner H. Stemer; Ralph E. Locher

(57) ABSTRACT

A ventilation module for a rail vehicle contains a housing having an air inlet, an air outlet, a dust discharge opening, a first cleaning station in an upper region of the housing, a cyclone separator which has a dust outlet and a cyclone air outlet. A second cleaning stage is disposed in a central region of the housing, which is arranged underneath the first cleaning stage such that air from the cyclone air outlet can reach the second cleaning stage. A dust discharge channel is connected to the dust outlet and is arranged in the central region. A dust discharge fan is set up to extract air and dust from the dust discharge channel and to remove the same through the dust discharge opening. A machine room fan is arranged in a lower region of the housing and is set up to extract air through the second cleaning station.

15 Claims, 6 Drawing Sheets

(51) Int. Cl.
*B01D 45/16* (2006.01)
*B04C 5/14* (2006.01)
*B04C 5/28* (2006.01)
*B61D 27/00* (2006.01)
*B61C 5/02* (2006.01)

(52) U.S. Cl.
CPC .............. *B04C 5/28* (2013.01); *B61D 27/009* (2013.01); *B04C 2009/002* (2013.01); *B04C 2009/005* (2013.01); *B61C 5/02* (2013.01)

(58) Field of Classification Search
CPC .... B01D 50/002; B01D 45/12; B61D 27/009; B61C 5/02; B61C 17/04
See application file for complete search history.

(56) References Cited

U.S. PATENT DOCUMENTS

| | | | | |
|---|---|---|---|---|
| 4,869,737 A | * | 9/1989 | Parenti | B01D 46/46 96/400 |
| 5,403,367 A | * | 4/1995 | De Villiers | B01D 50/002 55/320 |
| 5,788,728 A | * | 8/1998 | Solis | B01D 50/002 55/422 |
| 8,737,349 B2 | | 5/2014 | Schindler et al. | |
| 9,937,457 B2 | | 4/2018 | Wuebbeling et al. | |
| 2006/0130445 A1 | * | 6/2006 | Park | B04C 5/28 55/346 |
| 2013/0031878 A1 | * | 2/2013 | Menssen | F02M 35/0223 55/345 |
| 2013/0255203 A1 | * | 10/2013 | Muenkel | B01D 46/0021 55/337 |
| 2014/0290194 A1 | * | 10/2014 | Muenkel | F02M 35/02483 55/482 |
| 2014/0373490 A1 | * | 12/2014 | Wuebbeling | B01D 45/08 55/345 |
| 2016/0341158 A1 | * | 11/2016 | Rosenfeld | F02M 35/10013 |
| 2020/0318585 A1 | * | 10/2020 | Herman | B01D 46/442 |

FOREIGN PATENT DOCUMENTS

| | | |
|---|---|---|
| CN | 102923137 A | 2/2013 |
| CN | 103010224 A | 4/2013 |
| CN | 104228852 A | 12/2014 |
| DE | 102007011452 A1 | 9/2008 |
| DE | 102015006497 A1 | 12/2015 |
| EP | 2913242 A1 | 9/2015 |
| ES | 2362247 T3 | 6/2011 |
| JP | S6447670 A | 2/1989 |
| JP | 2015192982 A | 11/2015 |
| KR | 1020100100329 A | 9/2010 |
| RU | 138721 U1 | 3/2014 |
| WO | 0185516 A1 | 11/2001 |
| WO | 2012060139 A1 | 5/2012 |

* cited by examiner

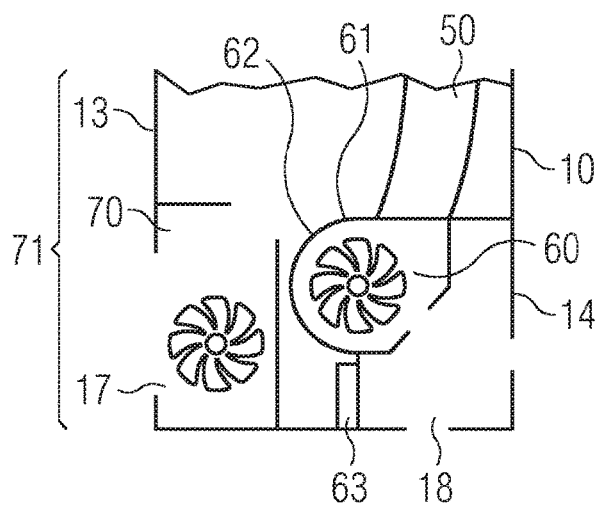
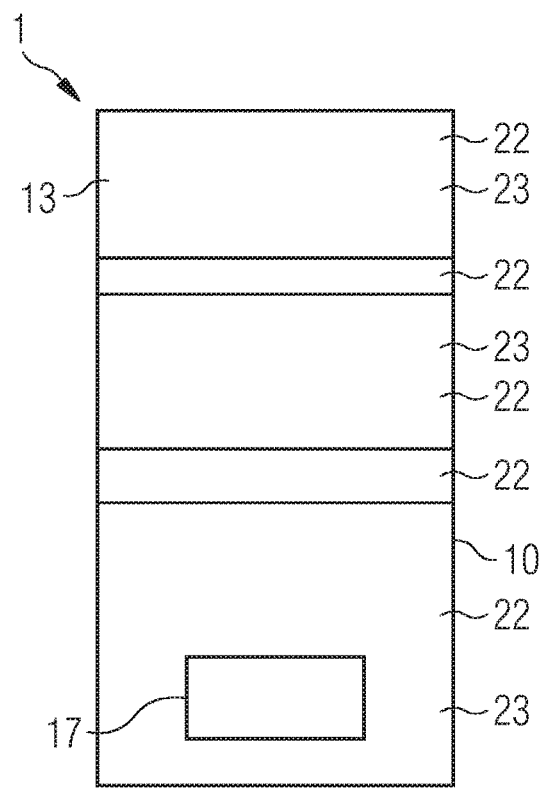
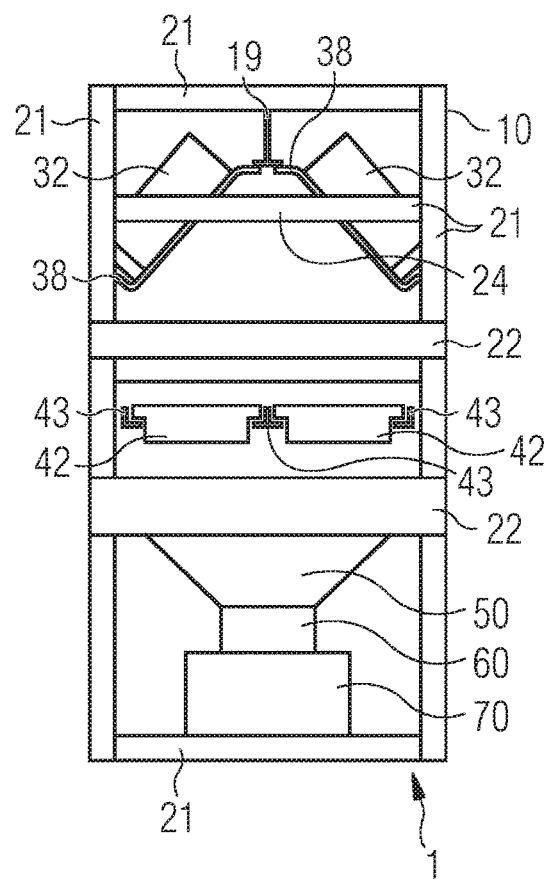

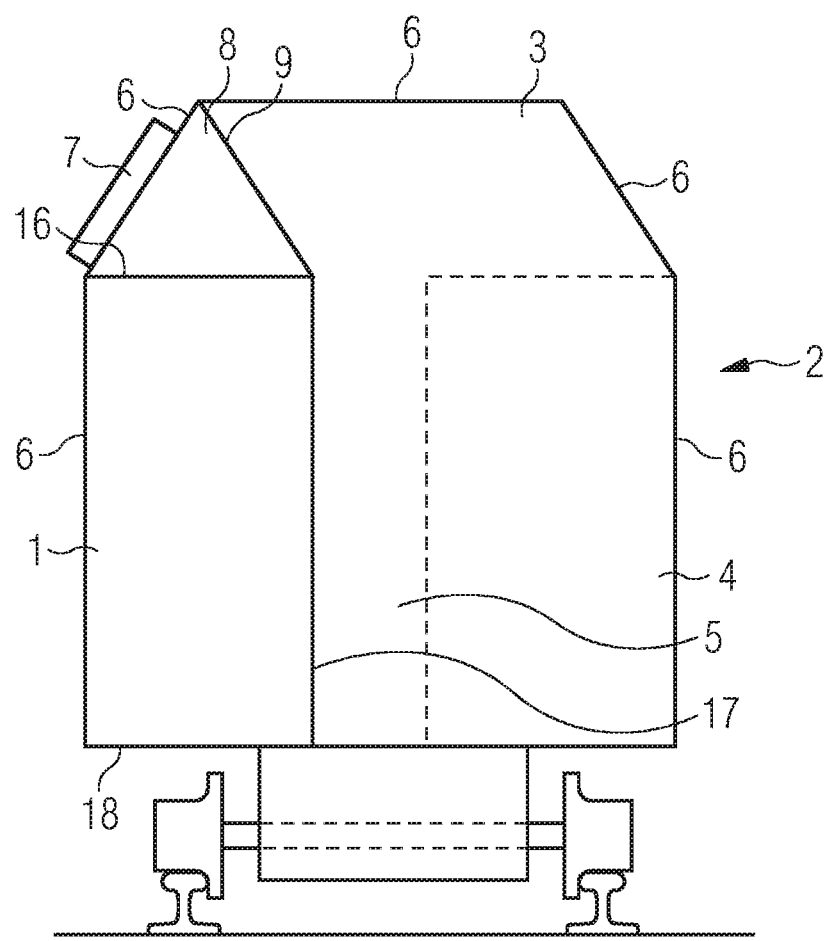

VENTILATION MODULE FOR A RAIL VEHICLE

BACKGROUND OF THE INVENTION

Field of the Invention

The invention relates to a ventilation module for a rail vehicle and to a rail vehicle having such a ventilation module.

Rail vehicles are used under different environmental conditions in regions with varying air quality. During operation, the rail vehicles require air, for example as cooling air or to provide oxygen for a combustion engine. The air provided should be as free from dust and other particles as possible, firstly to be able to ensure cooling and secondly to not contaminate a combustion engine with foreign substances.

The operation of a rail vehicle in desert regions poses a special problem, because windborne sand, for example owing to sandstorms but also owing to the relative wind of the rail vehicle, should as far as possible not pass into a machine room.

This problem is solved in the prior art by installing weather protection grilles in an outer wall of the rail vehicle, which forms a first filter stage. In addition, cyclone separators and filter elements are known which can act as a second and third filter stage and with which drawn-in air can be freed from dust, sand and particles before the air enters the machine room.

Cyclone separators and filter elements are fixedly installed in an intake tract of the rail vehicle. As a result, necessary maintenance work, for example the exchange of filter elements or the inspection and repair of fans in the intake tract, can be carried out only with difficulty, because for this purpose the rail vehicle has to be removed from regular traffic.

SUMMARY OF THE INVENTION

The problem addressed by the present invention is that of providing a ventilation concept for a rail vehicle which, on the one hand, meets the requirements for cleaned intake air for a machine room and which, on the other hand, is easy to maintain.

The problem is solved by the ventilation module of the independent patent claim. Advantageous configurations of the invention form the subject matter of dependent subclaims.

The ventilation module according to the invention for a rail vehicle comprises a housing, a first cleaning stage, a second cleaning stage, a dust discharge channel, a dust discharge fan and a machine room fan.

The housing has a top side, a bottom side, a front side, a rear side and two side walls. The rear side is situated opposite the front side. Furthermore, the housing has an air inlet, an air outlet and a dust discharge opening.

The first cleaning stage is arranged in an upper region of the housing, that is to say facing toward the top side of the housing. The first cleaning stage has a cyclone separator which has a dust outlet and a cyclone air outlet. Cyclone separators, which can also be referred to as centrifugal separators, cyclone filters or cyclones, serve as inertial force separators, in which an air flow with particles to be separated off is caused to form a vortex flow and the vortex flow separates the particles from the air flow owing to the centrifugal force. As a result, initial cleaning of the drawn-in air is achieved in the ventilation module, because dust and other particles such as sand are removed from the drawn-in air by means of the cyclone separator. The ventilation module is constructed in such a way that air that enters the ventilation module via the air inlet is guided through the cyclone separator. The air that has been cleaned of particles passes through the cyclone air outlet, and the removed particles are released via the dust outlet.

The second cleaning stage is arranged in a central region of the housing below the first cleaning stage in such a way that air can pass from the cyclone air outlet to the second cleaning stage. The second cleaning stage has a surface filter and/or a depth filter which faces toward the front side of the housing. Here, the surface filter may be designed as a panel filter or compact filter, and the depth filter may be designed as a pocket filter.

The dust discharge channel is connected to the dust outlet of the cyclone separator and is likewise arranged in the central region of the housing. The dust discharge channel faces toward the rear side of the housing. The particles removed from the drawn-in air by the cyclone separator are thus guided past the second cleaning stage by the dust discharge channel.

The dust discharge fan is configured to draw in air and particles, in particular dust, from the dust discharge channel and to remove them from the housing through the dust discharge opening.

The machine room fan is arranged in a lower region of the housing below the second cleaning stage and is configured to draw in air through the second cleaning stage and to release said air via the air outlet. The air emerging from the cyclone air outlet is thus drawn through the second cleaning stage by the machine room fan.

It may be provided that the machine room fan is configured to additionally draw in air through the first cleaning stage and/or through the air inlet. The machine room fan can be used to generate a positive pressure in a machine room in a rail vehicle in order to prevent dust from entering through other openings of the machine room.

It may be provided that the housing has dimensions of one meter by one meter in area and a height of approximately one and a half to two meters. Such dimensions make the ventilation module suitable for installation in a rail vehicle.

A rail vehicle has the ventilation module. Furthermore, the air inlet is connected to an outer wall of the rail vehicle. Here, the outer wall may be a side wall and/or a roof region of the rail vehicle. Where the outer wall is connected to the air inlet, the outer wall may have a weather protection grille.

The ventilation module may be arranged in a machine room of the rail vehicle. The air outlet may then be connected to the machine room, while the air inlet is not connected to the machine room. This can be achieved by means of corresponding walls and seals around the ventilation module. If the dimensions given above are used for the ventilation module, the ventilation module can be arranged with the rear side on an outer wall of the rail vehicle. Another module arranged opposite, which has similar dimensions, makes it possible to realize in the machine room a passage which is approximately sixty centimeters wide and which can thus be sufficient for some maintenance work.

Furthermore, the ventilation module may have shackles or eyelets, for example on the housing, in order to lift the ventilation module into, or move said ventilation module out of, the rail vehicle. Fastening means may additionally be provided, by means of which the ventilation module is fastened in the rail vehicle.

Multiple cyclone separators may be arranged in the first cleaning stage. Multiple surface filters and/or depth filters may be arranged in the second cleaning stage. Furthermore, multiple machine room fans may be arranged in the lower region of the housing. Advantageous configurations each with one of these elements will be described below. Configurations with a multiplicity of one or more of these elements are also intended to be included here.

In one embodiment of the ventilation module, the cyclone separator is a multicyclone with multiple axial separators arranged in one plane. A compact design of the cyclone separator is thus made possible.

In one embodiment, the plane of the multicyclone is arranged at an angle of zero to forty-five degrees with respect to one of the two side walls. This allows sand to be easily removed from the multicyclone owing to its angle of repose.

In one embodiment, the multicyclone has a cyclone housing and is arranged higher up on the front side of the housing than on a cyclone housing rear side which faces toward the rear side of the housing. Furthermore, the cyclone housing has a water outlet on the cyclone housing rear side, which water outlet is connected to the dust discharge channel. In this way, the cyclone separator can additionally be used for separating off water, wherein, owing to the arrangement of the multicyclone, water within the multicyclone passes to the water outlet under the action of gravitational force.

In one embodiment, the multicyclone or the cyclone housing is arranged on a mounting bracket. The mounting bracket may be fastened to mounting flanges in the housing. Guide lugs are arranged within the housing. During the fastening of the mounting bracket, this can be placed onto the guide lugs and subsequently brought into a mounting position. This simplifies the mounting process.

In one embodiment, the housing has, in the central region, a support frame for the surface filter and/or depth filter. The surface filter and/or depth filter can be inserted into the support frame and fixed there. The fixing may be performed by means of clamping frames and/or screws.

In one embodiment, the support frame has three support surfaces, wherein the support surfaces are arranged in a rectangle with a missing side. The surface filter and/or depth filter can be pushed into the support frame via the missing side. Here, the missing side may face toward the front side of the housing.

In one embodiment, a first dimension of the second cleaning stage from the front side to the dust discharge channel takes up between forty and eighty percent of the depth of the housing. Here, the depth of the housing is the dimension of the housing between the front side and the rear side.

In one embodiment, the machine room fan faces toward the front side of the housing and the dust discharge fan faces toward the rear side of the housing. Furthermore, the dust discharge fan may additionally have a fan housing with a rounded outer wall. In this case, after an uninstallation of the machine room fan, a board or a plate can be inserted into the housing and the dust discharge fan can be rolled out of the housing over the board or the plate.

In one embodiment, the housing comprises a load-bearing frame structure and wall elements. The wall elements form the top side, the bottom side, the front side, the rear side and the side walls of the housing. The air inlet, the air outlet and the dust discharge opening are arranged in the wall elements. The housing is otherwise sealed. Here, the sealing may be performed by means of seal elements. Furthermore, the wall elements may be welded to the load-bearing frame structure, whereby it is also possible to realize a seal.

Shackles or eyelets of the housing may then be attached to the load-bearing frame structure.

In one embodiment, wall elements of the front side are detachable in order to allow access into the housing. In one embodiment, the load-bearing frame structure has a removable cross brace which faces toward the front side. This further simplifies access to the housing. The removable cross brace can serve for stiffening the load-bearing frame structure.

In one embodiment, the air inlet is arranged in the upper region of the housing, in particular on the top side and/or on the rear side of the housing. In one embodiment, the air outlet is arranged on the front side of the housing. In one embodiment, the dust discharge opening is arranged on the bottom side of the housing.

In one embodiment, the ventilation module is configured to provide a volume flow of one and a half cubic meters of air per second. At least eighty-five percent of a specified test dust can be removed from the volume flow by means of the first cleaning stage. The second cleaning stage can, with a pressure change of at most three hundred Pascal, receive at least three hundred grams of the specified test dust. With such a ventilation module, a rail vehicle can be operated in desert regions, wherein a sufficiently long service life of the surface filter and/or depth filter is possible. The service life can be extended further by using better cyclone separators and/or better or more surface filters and/or depth filters. Here, the test dust defined as "ISO 12103-1 A4 coarse" may be used as the specified test dust.

Provision may be made for the ventilation module to be operated without the second cleaning stage. Provision may also be made for the first cleaning stage to be omitted. In this case, the dust discharge channel, the dust discharge fan and the dust discharge opening may also be omitted.

The above-described properties, features and advantages of this invention and the manner in which they are achieved will become more clearly and distinctly comprehensible by way of the explanation of the following highly simplified schematic illustrations of preferred exemplary embodiments.

BRIEF DESCRIPTION OF THE SEVERAL VIEWS OF THE DRAWING

FIG. 9 shows a lower region of a housing with machine room fan and dust discharge fan;

FIG. 10 shows a plan view of a third ventilation module;

FIG. 11 shows a plan view of the third ventilation module after the removal of wall elements;

FIG. 12 shows a cross section through a rail vehicle with a ventilation module.

DETAILED DESCRIPTION OF THE INVENTION

Figure 1:
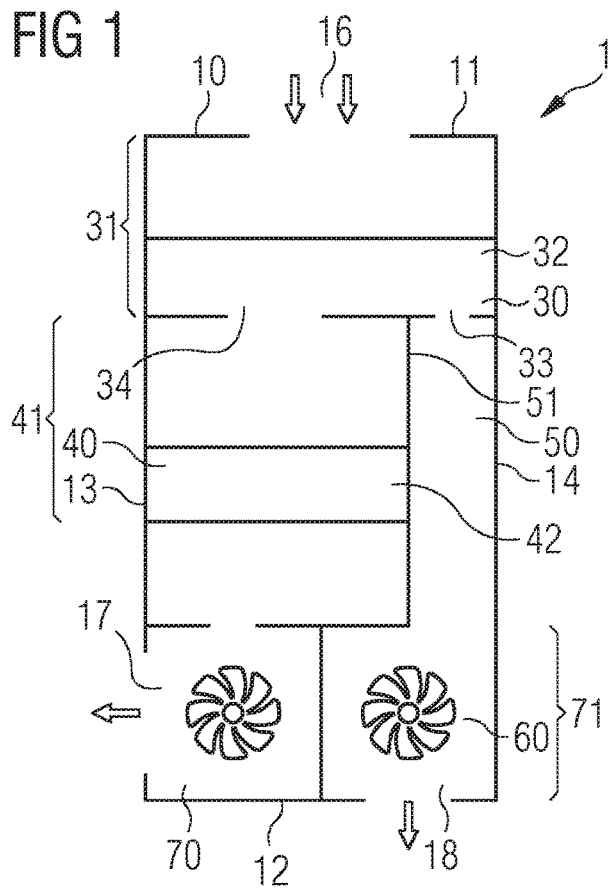
FIG. 1 shows a cross section through a first ventilation module.

FIG. 1 shows a cross section through a first exemplary embodiment of a ventilation module 1 for a rail vehicle. The ventilation module 1 has a housing 10 with a top side 11 and a bottom side 12. The cross section extends from a front side 13 to a rear side 14 of the housing 10. An air inlet 16 is arranged on the top side 11, an air outlet 17 is arranged on the front side 13 and a dust discharge opening 18 is arranged on the bottom side 12.

A first cleaning stage 30 is situated in an upper region 31 of the housing 10. The first cleaning stage 30 has a cyclone separator 32. The cyclone separator 32 has a dust outlet 33 and a cyclone air outlet 34. Here, the dust outlet 33 serves for the release of an air flow with the particles to be removed, while the cyclone air outlet 34 serves for the release of cleaned air.

A second cleaning stage 40 is arranged in a central region 41 below the first cleaning stage 30 in such a way that air can pass from the cyclone air outlet 34 to the second cleaning stage 40. The second cleaning stage 40 has a surface filter 42 and/or a depth filter 42 which may be designed as a pocket filter, panel filter or compact filter and which faces toward the front side 13 of the housing 10.

Furthermore, in the central region 41 of the housing 10, there is arranged a dust discharge channel 50 which faces toward the rear side 14 of the housing. A channel intermediate wall 51 separates the dust discharge channel 50 from the second cleaning stage 40. The dust discharge channel 50 is connected to the dust outlet 33 of the cyclone separator 32.

A dust discharge fan 60 is connected to the dust discharge channel 50 and is configured to draw in air and dust from the dust discharge channel 50 and to remove them from the housing through the dust discharge opening 18.

A machine room fan 70 is arranged in a lower region 71 of the housing 10 below the second cleaning stage 40. The machine fan 70 is configured to draw in air through the surface filter 42 and/or depth filter 42 and to discharge said air via the air outlet 17.

Air mixed with particles, in particular dust, enters the ventilation module 1 via the air inlet 16. Initial cleaning of the air that has entered is performed in the first cleaning stage 30, wherein particles are separated off by means of the cyclone separator 32. The separated-off particles pass to the dust discharge opening 18 via the dust outlet 33, the dust discharge channel 50 and the dust discharge fan 60. A smaller fraction of the particles entering via the air inlet 16 can however exit the cyclone separator 32 in the direction of the cyclone air outlet 34. These particles are removed from the air flow by the second cleaning stage 40 and in particular the surface filter 42 and/or depth filter 42. This allows cleaned air to be discharged by the machine room fan 70 via the air outlet 17.

By means of the channel intermediate wall 51, the central region 41 and the lower region 71 are divided into two mutually separate flow regions, wherein one flow region serves for the further cleaning of the air in the second cleaning stage 40 and the subsequent provision of cleaned air, and the other flow region serves for the removal of the particles via the dust discharge channel 50 and the dust discharge fan 60.

Figure 2:
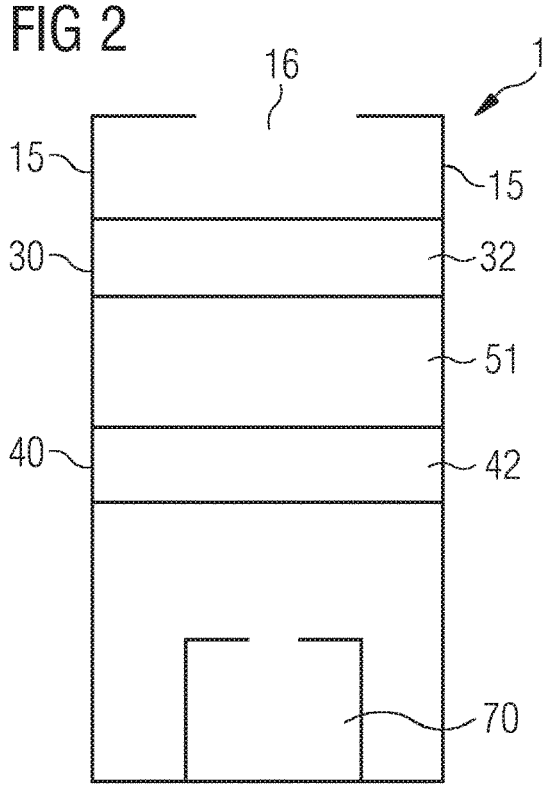
FIG. 2 shows a further cross section through the first ventilation module.

FIG. 2 shows a cross section through the ventilation module 1 of FIG. 1, wherein the section plane is perpendicular to the section plane of FIG. 1. The cross section extends between two side walls 15 of the housing 10 and runs through the cyclone separator 32, the surface filter 42 and/or depth filter 42 and the machine room fan 70.

The cyclone separator 32 lies horizontally in the exemplary embodiment in FIGS. 1 and 2, whereby an extremely small installation space is required. The cyclone separator 32 may be designed as a multicyclone with multiple axial separators arranged in one plane.

It may be provided that the housing 10 has dimensions of one meter by one meter in area and a height of approximately one and a half to two meters. Such dimensions make the ventilation module 1 suitable for installation in a rail vehicle.

In FIGS. 1 and 2, the dust discharge fan 60 is arranged in the lower region 71. It is however likewise possible to arrange the dust discharge fan 60 at a different location, for example in the central region 41.

Figure 3:
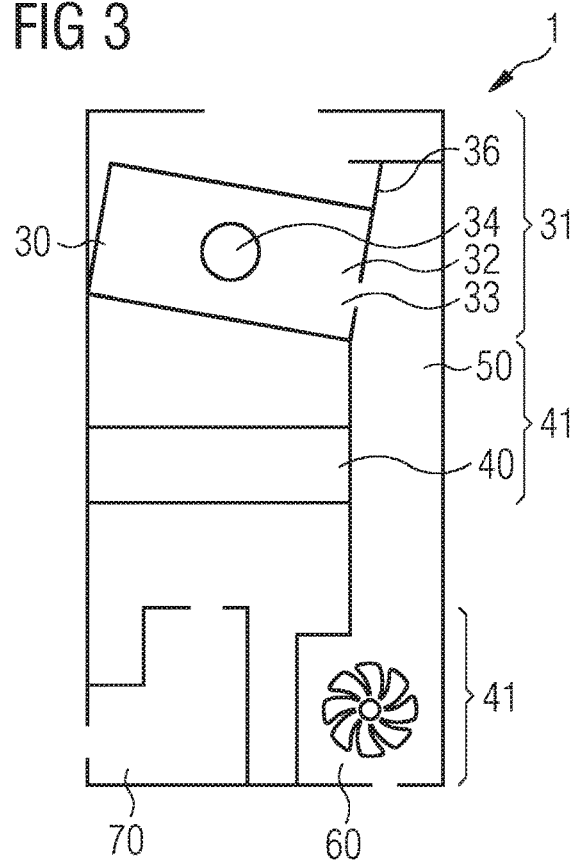
FIG. 3 shows a cross section through a second ventilation module.
Figure 4:
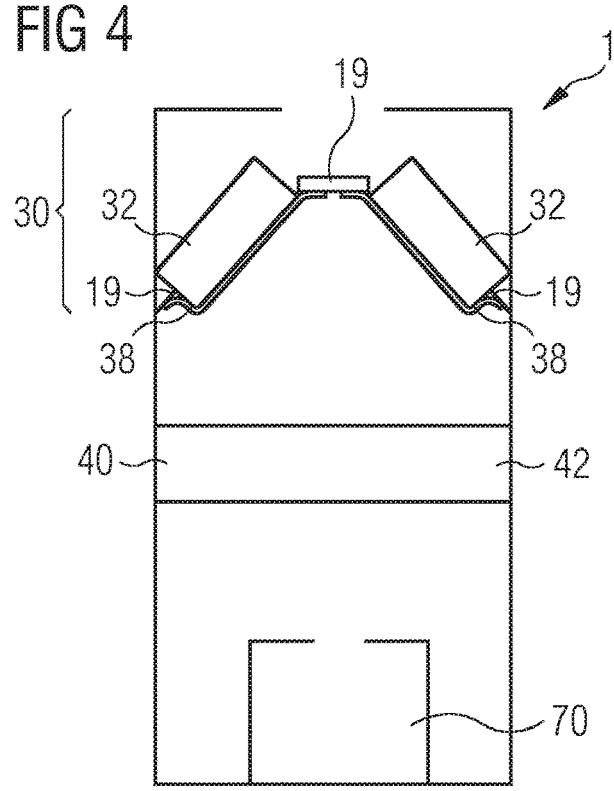
FIG. 4 shows a further cross section through the second ventilation module.

FIGS. 3 and 4 show cross sections through a second exemplary embodiment of a ventilation module 1, which corresponds to the ventilation module of FIGS. 1 and 2 unless differences are described below.

The first cleaning stage 30 is constructed differently in this exemplary embodiment. The first cleaning stage 30 comprises two cyclone separators 32, each of which is designed as a multicyclone with multiple axial separators arranged in one plane. The cyclone separators 32 are each arranged on a mounting bracket 38 and the mounting bracket 38 is in each case fastened to the housing 10. Furthermore, the plane of the axial separators has an angle of 45 degrees to the side walls 15 and the cyclone separators 32 are arranged axially symmetrically with respect to one another. The cyclone separators 32 may also be arranged at a smaller angle, down to zero degrees, with respect to the side walls 15. The inclined arrangement of the cyclone separators 32 improves the overall ability to extract particles from the air stream.

It is illustrated in FIG. 3 that the cyclone separators 32 are arranged higher up on the front side 13 of the housing 10 than on a cyclone housing rear side 36 which faces toward the rear side 14 of the housing 10. Alternatively, provision may be made for the cyclone separator 32 to be attached to the front side 13 and to the cyclone housing rear side 36 at the same height.

It is illustrated in FIG. 4 that the mounting bracket 38 lies in each case against two mounting flanges 19 of the housing 10. Fastening means can be used there in order to fasten the mounting bracket 38 to the housing 10.

Figure 5:
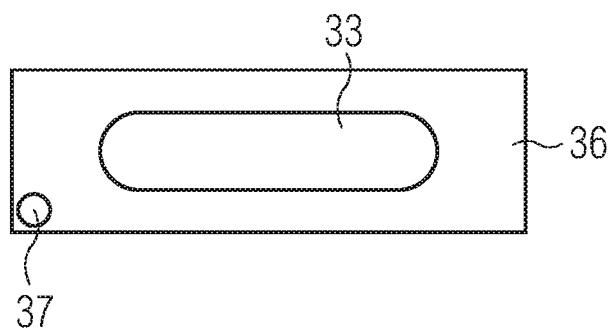
FIG. 5 shows a cyclone housing rear side with water outlet.

FIG. 5 shows a plan view of the cyclone housing rear side 36 of one of the cyclone separators 32 of FIG. 3. The cyclone housing rear side 36 has the dust outlet 33 and, in addition, a water outlet 37 in one corner. The water outlet 37 may be connected to the dust discharge channel 50. This has the effect, in particular if the cyclone separator 32 is installed obliquely, as illustrated in FIG. 3, that water that collects in the interior of the cyclone separator 32 can be released via the water outlet 37 likewise to the dust discharge channel 50. The cleaning performance of the first cleaning stage 30 is thus further improved.

It may be provided that the dust outlet 33 and the water outlet 37 are implemented in a common opening of the cyclone housing rear side 36.

It is alternatively also possible for no water outlet 37 to be provided. The cyclone separator 32 may then also be installed without the oblique arrangement of FIG. 3.

Alternatively or in addition, extraction of water by suction may be performed via the dust discharge channel 50, in the case of which those points in the housing 10 at which water can collect under the action of gravitational force are connected to the dust discharge channel 50 by means of a line. This may be implemented for example below the cyclone separator 32 and/or on the mounting bracket 38 and/or the mounting flanges 19.

Figure 6:
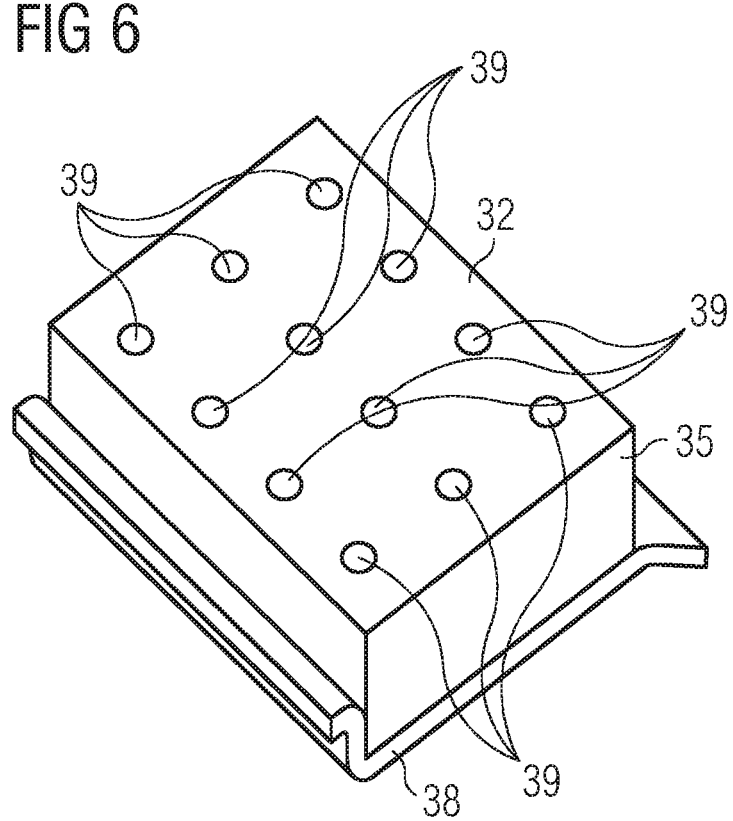
FIG. 6 shows a multicyclone on a mounting bracket.

FIG. 6 shows a detail view of a cyclone separator 32, which is arranged on a mounting bracket 38 and which is designed as a multicyclone with multiple axial separators 39 arranged in one plane. In this way, a compact structural form of the cyclone separator 32 within a cyclone housing 35 is attained. It may be provided that the mounting bracket 38 and the cyclone housing 35 are formed as a single piece.

Figure 7:
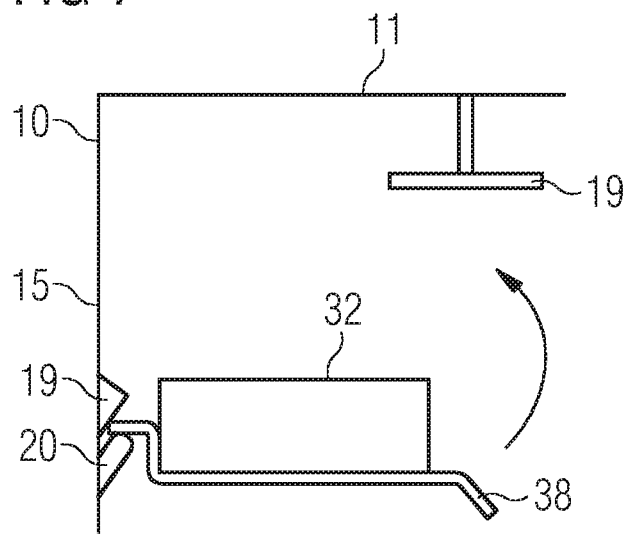
FIG. 7 shows the installation of the multicyclone into the housing.

FIG. 7 shows how a cyclone separator 32 on a mounting bracket 38 can be installed into a housing. The mounting bracket 38 is placed onto a guide lug 20, wherein the guide lug 20 is arranged on the side wall 15. A mounting flange 19 is situated directly above the guide lug 20. The cyclone separator 32 lies horizontally and is now supported by the guide lug 20. It is also possible for more than one guide lug 20 to be provided, which may in particular also be arranged at different heights in order to arrive at the installation position in FIG. 3. In order to now install the cyclone separator 32 into the housing 10, the mounting bracket 38 is, on the side facing away from the guide lug 20, moved upward in the direction of the top side 11 and of the mounting flange 19 proceeding from the top side 11. The mounting bracket 38 subsequently lies against the mounting flanges 19 and can now be fastened to the mounting flanges 19, for example by means of screws. The movement of the mounting bracket necessary for this is indicated by an arrow in FIG. 7.

Figure 8:
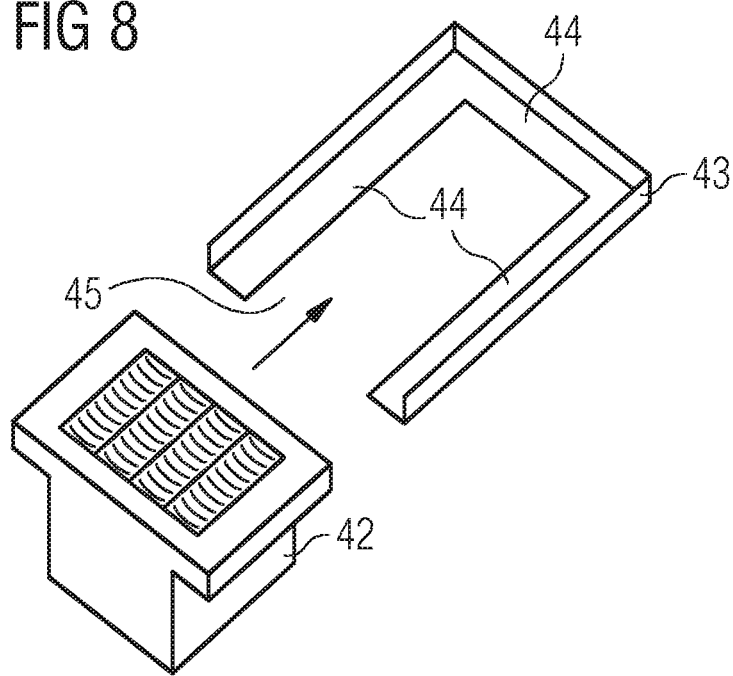
FIG. 8 shows a support frame for a surface filter.

FIG. 8 shows a detail view of a support frame 43 which serves for receiving a surface filter 42 and/or a depth filter 42. Such a support frame 43 can be inserted into the housing 10 at the level of the second cleaning stage 40. The support frame 43 may be screwed or welded to the housing 10. The surface filter 42 is inserted into the support frame 43 and fixed there. Multiple such support frames 43 may be provided next to one another for multiple surface filters 42 and/or depth filters 42.

The fixing of the surface filter 42 and/or depth filter 42 in the support frame 43 may be performed by fastening means, in particular screws and/or clamping frames.

The support frame 43 has three support surfaces 44 which are arranged in a rectangle with a missing side 45. The surface filter 42 can, as indicated in FIG. 8 by an arrow, be pushed into the support frame 43 via the missing side 45. Here, the missing side 45 may face toward the front side 13 of the housing 10, whereby an insertion and removal of the surface filter 42 in the housing 10 of the ventilation module 1 is simplified. A depth filter can be inserted into the support frame 43 in an analogous manner.

It may be provided that a first dimension of the second cleaning stage 40 from the front side 13 of the housing 10 to the dust discharge channel 50, in particular to the channel intermediate wall 51, is between forty and eighty percent of the depth of the housing 10, wherein the depth of the housing 10 is the dimension between the front side 13 and the rear side 14 of the housing 10. The first dimension is preferably between fifty and seventy percent of the depth of the housing 10. In this way, there is firstly sufficient space for the second cleaning stage 40 and secondly sufficient space for the dust discharge channel 50.

The first cleaning stage 30 may take up up to ninety percent of the depth of the housing 10, preferably between sixty and eighty percent.

FIG. 9 shows a detail view of the lower region 71 of the housing 10. The machine room fan 70 faces toward the front side 13 of the housing 10. The dust discharge fan 60 faces toward the rear side of the housing. The dust discharge fan 60 has a fan housing 61 with a rounded outer wall 62. This serves to simplify maintenance of the ventilation module 1. The dust discharge fan 60 can be damaged by particles, in particular sand, which pass to the dust discharge fan 60 via the dust discharge channel 50. After an uninstallation of the machine room fan 70, a board can be inserted into the lower region 71 of the housing 10. For this purpose, a projection 63 may be provided below the dust discharge fan 60. By means of the rounded outer wall 62, the dust discharge fan 60 can now be rolled in the direction of the front side 13 of the housing 10 and removed from there for maintenance purposes.

The particles, in particular sand, which pass to the dust discharge fan 60 via the dust discharge channel 50 can also damage parts of the dust discharge channel 50. For this reason, provision can be made for the dust discharge channel 50 to be designed in such a way that parts of the dust discharge channel 50 are removable, for example the channel intermediate wall 51.

FIG. 10 shows a plan view of a third exemplary embodiment of the ventilation module 1. The housing 10 of the ventilation module 1 comprises a load-bearing frame structure and wall elements 22. In the plan view, five wall elements 22 can be seen, which form the front side 13 of the housing 10. The top side 11, the bottom side 12, the rear side 14 and the side walls 15 may likewise be implemented by means of wall elements 22. The air outlet 17 is arranged in one of the wall elements 22. Air inlet 16 and dust discharge opening 18 may likewise be arranged in wall elements 22.

Three of the wall elements 22 are detachable wall elements 23 and can be removed from the housing 10. The detachable wall elements 23 may for example be attached by means of screws. This makes it possible for maintenance access to be provided. Non-detachable wall elements 22 may for example also be welded to the load-bearing frame structure.

Any shackles or eyelets that serve for lifting of the ventilation module 1 may be attached to the load-bearing frame structure.

FIG. 11 shows the ventilation module of FIG. 10, in which the three detachable wall elements 23 have been removed. As a result, the load-bearing frame structure 21 is visible, which serves to provide a stable frame structure of the housing 10. Furthermore, the interior of the ventilation module 1 is visible. The ventilation module 1 has two cyclone separators 32 designed as multicyclones, which are fastened to mounting flanges 19 by means of mounting brackets 38 analogously to FIG. 7. The surface filters 42 and/or depth filters 42 are, as shown in FIG. 8, inserted into a support frame 43. Here, two surface filters 42 are arranged next to one another. It is alternatively also possible for depth filters 42 to be provided. Furthermore, dust discharge channel 50, dust discharge fan 60 and machine room fan 70 are arranged as shown in FIG. 1.

By removing the detachable wall elements 23, cyclone separators 32, surface filters 42 and dust discharge fans 60 and machine room fans 70 are accessible from the front side 13 of the housing, and maintenance can be performed on them accordingly.

A removable cross brace 24 is arranged in front of the cyclone separators 32. The removable cross brace 24 is part of the load-bearing frame structure 21. In order to perform maintenance on the cyclone separators 32, the removable cross brace 24 can be removed. Alternatively, the load-bearing frame structure 21 may be designed without the removable cross brace 24. The arrangement of the load-bearing frame structure 21 and of the removable cross brace 24 may be configured differently than illustrated in FIG. 11.

In the exemplary embodiments shown, the air inlet 16 is arranged in the upper region 31 of the housing 10 on the top side 11. Alternatively, the air inlet may also be arranged on the rear side 13 or on a side wall 15. The air outlet 17 is arranged on the front side 13 of the housing 10. Alternatively, the air outlet 17 may also be arranged on a side wall 15. The dust discharge opening 18 is arranged on the bottom side 12 of the housing 10. Alternatively, the dust discharge opening 18 may also be arranged in the lower region 71 on the rear side 13 of the housing 10.

It may be provided that the ventilation module 1 is configured to provide a volume flow of one and a half cubic meters of air per second. At least eighty-five percent of a specified test dust is removed from the volume flow by means of the first cleaning stage 30. The second cleaning stage 40 can, with a pressure change of at most three hundred Pascal, receive at least three hundred grams of the specified test dust. With such a ventilation module 1, a rail vehicle can be operated in desert regions, wherein a sufficiently long service life of the surface filter 42 and/or depth filter 42 is possible. The service life can be extended further by using better cyclone separators 32 and/or better or more surface filters 42 and/or depth filters 42. Here, the test dust defined as "ISO 12103-1 A4 coarse" may be used as the specified test dust.

FIG. 12 shows a cross section through a rail vehicle 2, in which a machine room 3 comprises a ventilation module 1 according to the invention and a further module 4. A passage 5, which serves for maintenance purposes, is arranged between the ventilation module 1 and the module 4. If the dimensions given above are used for the ventilation module and also for the module 4, a passage 5 which is approximately sixty centimeters wide can be provided. The air inlet 16 of the ventilation module 1 is connected to an outer wall 6 of the rail vehicle 2 via a channel 8 which is separated from the machine room 3 by means of a partition 9. The air outlet 17 of the ventilation module faces toward the machine room 3. In this way, air drawn in via the channel 8 can be cleaned in the ventilation module 1 as described and subsequently used in the machine room 3 as cooling air and/or to provide oxygen for a combustion engine.

At the location where the channel 8 meets the outer wall 6, an optional weather protection grille 7 is attached, which serves to additionally clean the drawn-in air, in particular to remove water.

The rail vehicle 2 may be designed such that the outer wall 6 above the ventilation module 1 can be opened in order to remove the ventilation module 1 from the rail vehicle. It is then possible, for example for maintenance purposes, for the ventilation module 1 to be removed and another ventilation module 1 installed. The rail vehicle 2 is then ready for use again while repairs are carried out on the removed ventilation module 1.

In order that dust and/or particles that exit the ventilation module 1 via the dust discharge opening 18 can be removed from the rail vehicle 2, an opening may be provided there in the machine room 3, through which opening the dust or the particles fall down out of the rail vehicle 2.

Although the invention has been illustrated and described in more detail on the basis of the preferred exemplary embodiment, the invention is not restricted by the examples disclosed, and other variations may be derived herefrom by a person skilled in the art without departing from the scope of protection of the invention.

The invention claimed is:

1. A ventilation module for a rail vehicle, the ventilation module comprising:
   a housing with a top side, a bottom side, a front side, a rear side opposite said front side and two side walls, said housing further having an air inlet, an air outlet and a dust discharge opening formed therein;
   a first cleaning stage disposed in an upper region of said housing, said first cleaning stage having a cyclone separator with a dust outlet and a cyclone air outlet formed therein;
   a second cleaning stage disposed in a central region of said housing, said second cleaning stage being disposed below said first cleaning stage in such a way that air from said cyclone air outlet can pass to said second cleaning stage, wherein said second cleaning stage having a surface filter and/or a depth filter, wherein said surface filter and/or said depth filter facing toward said front side of said housing;
   a dust discharge channel connected to said dust outlet of said cyclone separator, wherein said dust discharge channel is disposed in said central region of said housing, wherein said dust discharge channel facing toward said rear side of said housing;
   a dust discharge fan configured to draw in the air and dust from said dust discharge channel and to remove the air and the dust from said housing through said dust discharge opening; and
   a machine room fan disposed in a lower region of said housing below said second cleaning stage, wherein said machine room fan being configured to draw in the air through said second cleaning stage and to release the air via said air outlet.

2. The ventilation module according to claim 1, wherein said cyclone separator is a multicyclone with multiple axial separators disposed in one plane.

3. The ventilation module according to claim 2, wherein the plane is disposed at an angle of 0 to 45 degrees with respect to one of said two side walls.

4. The ventilation module according to claim 2, wherein:
   said multicyclone is disposed higher up on said front side of said housing than on a cyclone housing rear side which faces toward said rear side of said housing; and
   said multicyclone has a water outlet formed therein and connected to said dust discharge channel.

5. The ventilation module according to claim 2, further comprising:
   mounting flanges disposed in said housing;
   a mounting bracket, said multicyclone is disposed on said mounting bracket, wherein said mounting bracket is fastened to said mounting flanges; and
   guide lugs disposed in said housing, wherein, for fastening said mounting bracket, said mounting bracket with said multicyclone can be placed onto said guide lugs and subsequently brought into a mounting position.

6. The ventilation module according to claim 1, wherein said housing has, in said central region, a support frame for said surface filter and/or said depth filter, wherein said surface filter and/or said depth filter can be inserted into said support frame and fixed there.

7. The ventilation module according to claim 6, wherein said support frame has three support surfaces, wherein said support surfaces are disposed in a rectangle with a missing side, wherein said surface filter and/or said depth filter can be pushed into said support frame via said missing side.

8. The ventilation module according to claim 1, wherein a first dimension of said second cleaning stage from said front side of said housing to said dust discharge channel is between forty and eighty percent of a depth of said housing, wherein the depth of said housing is a dimension between said front side and said rear side of said housing.

9. The ventilation module according to claim 1, wherein:
said dust discharge fan faces toward said rear side of said housing;
said machine room fan faces toward said front side of said housing; and
said dust discharge fan has a fan housing with a rounded outer wall.

10. The ventilation module according to claim 1, wherein said housing contains a load-bearing frame structure and wall elements, wherein said wall elements form said top side, said bottom side, said front side, said rear side and said side walls, wherein said air inlet, said air outlet and said dust discharge opening are disposed in said wall elements and said housing is otherwise sealed.

11. The ventilation module according to claim 10, wherein said wall elements of said front side are detachable in order to allow access into said housing.

12. The ventilation module according to claim 11, wherein said load-bearing frame structure has a removable cross brace which faces toward said front side.

13. The ventilation module according to claim 1, wherein:
said air inlet is disposed in said upper region of said housing on said top side and/or said rear side of said housing;
said air outlet is disposed on said front side of said housing; and
said dust discharge opening is disposed on said bottom side of said housing.

14. The ventilation module according to claim 1, wherein the ventilation module provides a volume flow of one and a half cubic meters of air per second, wherein at least 85 percent of a specified test dust can be removed from the volume flow by means of said first cleaning stage, and wherein said second cleaning stage can, with a pressure change of at most 300 Pascal, receive at least 300 grams of the specified test dust.

15. A rail vehicle, comprising:
a ventilation module according to claim 1; and
an outer wall of the rail vehicle, said air inlet is connected to said outer wall, wherein said outer wall having a weather protection grille at a point which is connected to said air inlet.

* * * * *